(12) United States Patent
Lee

(10) Patent No.: US 12,198,387 B2
(45) Date of Patent: Jan. 14, 2025

(54) APPLICATION PROCESSOR INCLUDING NEURAL PROCESSING UNIT AND OPERATING METHOD THEREOF

(71) Applicant: Samsung Electronics Co., Ltd., Suwon-si (KR)

(72) Inventor: Joohyun Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 353 days.

(21) Appl. No.: 17/700,765

(22) Filed: Mar. 22, 2022

(65) Prior Publication Data
US 2022/0309712 A1 Sep. 29, 2022

(30) Foreign Application Priority Data
Mar. 23, 2021 (KR) .................. 10-2021-0037440

(51) Int. Cl.
| | | |
|---|---|---|
| *G06V 10/00* | (2022.01) | |
| *G06T 1/20* | (2006.01) | |
| *G06T 5/70* | (2024.01) | |
| *G06T 7/90* | (2017.01) | |

(52) U.S. Cl.
CPC .................. *G06T 7/90* (2017.01); *G06T 1/20* (2013.01); *G06T 5/70* (2024.01); *G06T 2207/20081* (2013.01); *G06T 2207/20084* (2013.01)

(58) Field of Classification Search
CPC .......... G06N 3/08; G06N 3/02; G06N 3/082; G06N 3/092; G06N 3/0475; G06N 3/0454; G06N 3/042; G06N 3/0464; G06N 3/049; G06N 3/045; G06T 2207/10004; G06T 2207/10024; G06T 2207/20081; G06T 2207/20084; G06T 5/00; G06T 5/70; G06T 5/002; G06T 7/90; G06T 1/20; H04N 9/646
See application file for complete search history.

(56) References Cited

U.S. PATENT DOCUMENTS

| | | | | |
|---|---|---|---|---|
| 5,167,007 A | * | 11/1992 | Toyoda ................ | G06N 3/0675 706/40 |
| 9,288,413 B2 | | 3/2016 | Chawla et al. | |
| 9,756,266 B2 | | 9/2017 | Mills et al. | |
| 10,311,547 B2 | * | 6/2019 | Michelini ............. | G06T 3/4053 |

(Continued)

FOREIGN PATENT DOCUMENTS

KR 10-2015-0034953 A 4/2015

OTHER PUBLICATIONS

Shintani Sadanori, "JPH06187456A Neural network image recognizing method and device therefor"; Publication Date: Jul. 8, 1994.*

*Primary Examiner* — Amir Alavi
(74) *Attorney, Agent, or Firm* — Harness, Dickey & Pierce, P.L.C.

(57) ABSTRACT

An application processor includes a neural processing unit configured to convert an input image into a first image based on a first pattern and generate a second image using a neural network, the second image compensating for the conversion; and an image signal processor including a plurality of pipelines configured to perform image signal processing, the plurality of pipelines including at least a first pipeline configured to receive the first image and a second pipeline configured to receive the second image.

20 Claims, 10 Drawing Sheets

(56) References Cited

U.S. PATENT DOCUMENTS

| | | |
|---|---|---|
| 10,460,231 B2 | 10/2019 | Zhang et al. |
| 10,841,659 B2 | 11/2020 | Jun et al. |
| 10,848,709 B2 | 11/2020 | Zhang et al. |
| 10,989,779 B2 * | 4/2021 | Hyun .................... G06T 7/0014 |
| 11,004,169 B2 * | 5/2021 | Nemes .................... G06F 21/16 |
| 11,272,074 B2 * | 3/2022 | Achiwa .................... G06N 3/08 |
| 11,367,165 B2 * | 6/2022 | Xiao .................... G06T 3/4053 |
| 11,451,740 B1 * | 9/2022 | Wang .................... G06T 5/40 |
| 11,461,639 B2 * | 10/2022 | Liu .................... G06V 10/82 |
| 11,526,990 B1 * | 12/2022 | Tamir .................... G06V 10/764 |
| 2015/0097108 A1 * | 4/2015 | Bishay .................... H04N 23/45 |
| | | 250/208.1 |
| 2017/0160747 A1 | 6/2017 | Aghamohammadi et al. |
| 2018/0013955 A1 * | 1/2018 | Kim .................... G06F 1/1686 |
| 2020/0154034 A1 | 5/2020 | Furumochi et al. |
| 2020/0234044 A1 | 7/2020 | Cai et al. |
| 2020/0314364 A1 | 10/2020 | Kim et al. |
| 2020/0322530 A1 | 10/2020 | Choi et al. |
| 2020/0364837 A1 | 11/2020 | Kim |
| 2020/0389588 A1 | 12/2020 | Sharma et al. |
| 2022/0309712 A1 * | 9/2022 | Lee .................... G06T 7/90 |

* cited by examiner

APPLICATION PROCESSOR INCLUDING NEURAL PROCESSING UNIT AND OPERATING METHOD THEREOF

CROSS-REFERENCE TO RELATED APPLICATION

This application is based on and claims priority under 35 U.S.C. § 119 to Korean Patent Application No. 10-2021-0037440, filed on Mar. 23, 2021, in the Korean Intellectual Property Office, the disclosure of which is incorporated by reference herein in its entirety.

BACKGROUND

The inventive concepts relate to an application processor, and more particularly, to an application processor having a structure for optimizing image signal processing and an operating method thereof.

Image sensors may convert an optical signal input, for example, through an optical lens into an electrical image signal. Recent image sensors have structures modified according to the products on which the image sensors are mounted, and may generate images in various patterns. Application processors may include a processing unit, which converts an image generated by an image sensor into an image of an RGB type. Since the pattern of the images generated by the image sensors may vary, the structure of an application processor for optimizing the use of hardware resources in conversion into an image of an RGB type is desired.

SUMMARY

The inventive concepts provide an application processor having a structure for optimizing image signal processing and an operating method thereof.

According to an aspect of the inventive concepts, there is provided an application processor including a neural processing unit configured to convert an input image into a first image based on a first pattern and generate a second image using a neural network, the second image compensating for the conversion; and an image signal processor including a plurality of pipelines configured to perform image signal processing, the plurality of pipelines including at least a first pipeline configured to receive the first image and a second pipeline configured to receive the second image.

According to another aspect of the inventive concept, there is provided an application processor including a neural processing unit configured to generate a first image from an input video using a neural network, the input video being provided from an image sensor and including a plurality of frames, and the first image representing information regarding the plurality of frames; and an image signal processor configured to convert the plurality of frames into a second image based a Bayer pattern and to perform image signal processing on the second image based on the first image.

According to a further aspect of the inventive concept, there is provided an operating method of an application processor. The operating method includes receiving an input image; converting the input image into a first image in a Bayer pattern using a neural network; generating a second image using the neural network, the second image compensating for the conversion; and performing image signal processing on the first image based on the second image.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
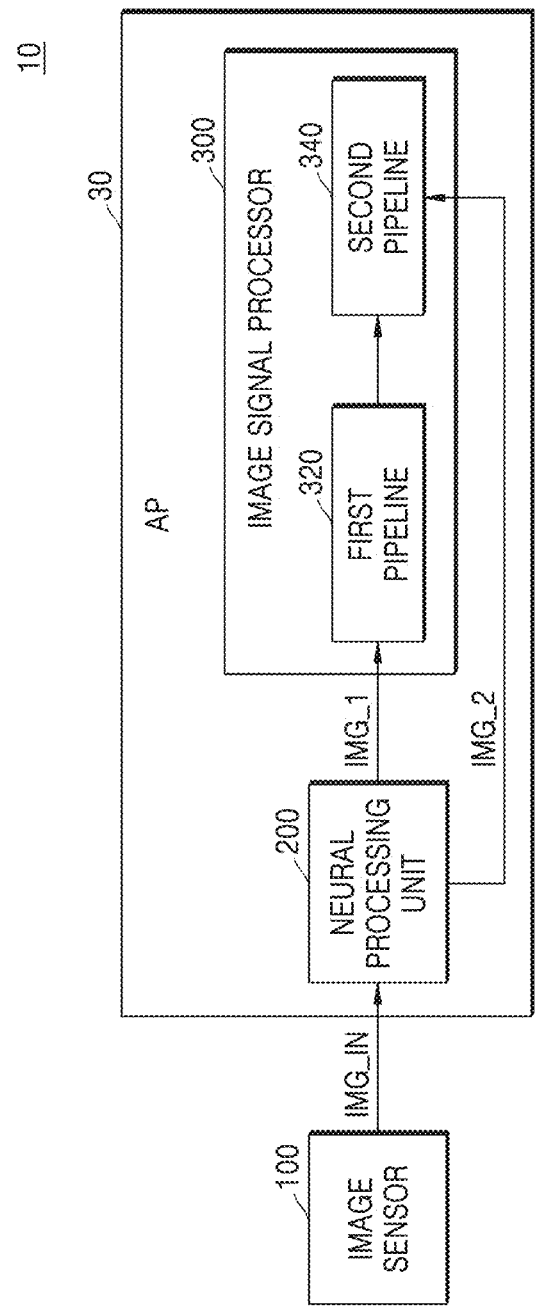
FIG. 1 is a schematic block diagram of an image processing system according to some example embodiments.

FIG. 1 is a schematic block diagram of an image processing system according to some example embodiments.

Referring to FIG. 1, an image processing system 10 may include an image sensor 100 and an application processor (AP) 30 processing an image received from the image sensor 100.

The image sensor 100 may convert an optical signal input through an optical lens into an electrical signal. The image sensor 100 may include a pixel array (not shown), which includes a plurality of pixels in a matrix, and a color filter array (not shown) above the pixel array. In this case, when an optical signal in a certain wavelength band, which passes through the color filter array among optical signals input through the optical lens, is input to the pixel array, an image including color information may be generated.

In some embodiments, the image sensor 100 may be mounted on and/or in an electronic device having an image and/or light sensing function. For example, the image sensor 100 may be mounted on and/or in an electronic device such as a camera, a smartphone, a wearable device, an internet of things (IoT) device, a tablet personal computer (PC), a personal digital assistant (PDA), a portable multimedia player (PMP), a navigation device, etc. In some embodiments, the image sensor 100 may be mounted on and/or in an electronic device that is used as a component of vehicles, furniture, manufacturing facilities, doors, or various kinds of measuring equipment.

The image sensor 100 may generate images in various patterns according to the arrangement of a color filter array, an exposure time difference between pixels, the position of a camera module (e.g., a camera module at the bottom of a display), and/or the like. An image generated by the image sensor 100 to have one of various patterns may be provided to the AP 30 as an input image IMG_IN.

The AP 30 may perform image signal processing on the input image IMG_IN received from the image sensor 100. The AP 30 may generally control image-processing operations and may include a plurality of processing units which convert and/or process the input image IMG_IN. An image converted and/or processed by the processing units may be provided to a display device (not shown). For example, the AP 30 may include a system-on-chip (SoC) formed by mounting a plurality of processing units on a single chip.

The AP 30 may include a neural processing unit 200 performing conversion on the input image IMG_IN. The neural processing unit 200 may convert the input image IMG_IN into a first image IMG_1 including a first pattern using a neural network. For example, the first pattern may refer to an image pattern that is used to process an image by an image signal processor 300, and the image to be processed (e.g., the input image IMG_IN) may have a pattern different from the first pattern and/or may be converted into the first pattern. In some embodiments, the first pattern may be a mosaic pattern including information about the intensity of at least one wavelength region of light and/or may be used to convert raw image data (e.g., input image IMG_IN).

The neural processing unit 200 may generate a second image IMG_2 from the input image IMG_IN using the neural network. The second image IMG_2 may include information for compensating for a data loss area, which may occur when the pattern of the input image IMG_IN is converted. The image signal processor 300 may generate an image of similar quality to the input image IMG_IN by correcting the first image IMG_1 based on the second image IMG_2.

The image signal processor 300 may receive the first image IMG_1 in the first pattern from the neural processing unit 200 and perform various image-processing operations on the first image IMG_1. For example, the image signal processor 300 may perform at least one image processing operation selected from bad pixel correction, offset correction, lens distortion correction, phase detection auto focus, dynamic range compression, color gain correction, shading correction, gamma correction, denoising, and/or sharpening.

In some embodiments, the image signal processor 300 may include a plurality of pipelines, e.g., a first pipeline 320 and a second pipeline 340. A pipeline may use a pipeline method in which output data of a previous stage is used as input data of a subsequent stage. A pipeline may refer to, for example, an element to which function modules processing data are connected. The image signal processor 300 may include the first pipeline 320 and the second pipeline 340. In this case, the first pipeline 320 may receive the first image IMG_1; the second pipeline 340 may receive an output image of the first pipeline 320 and the second image IMG_2; and accordingly, image signal processing may be performed in stages.

According to some example embodiments, an operation of converting the pattern of the input image IMG_IN is offloaded onto the neural processing unit 200, and accordingly, the hardware usage and layout area of the image signal processor 300 may be decreased. In addition, the image signal processor 300 may compensate for a data loss area, which may occur due to conversion, and increase image quality by correcting the first image IMG_1 based on the second image IMG_2.

Figure 2:
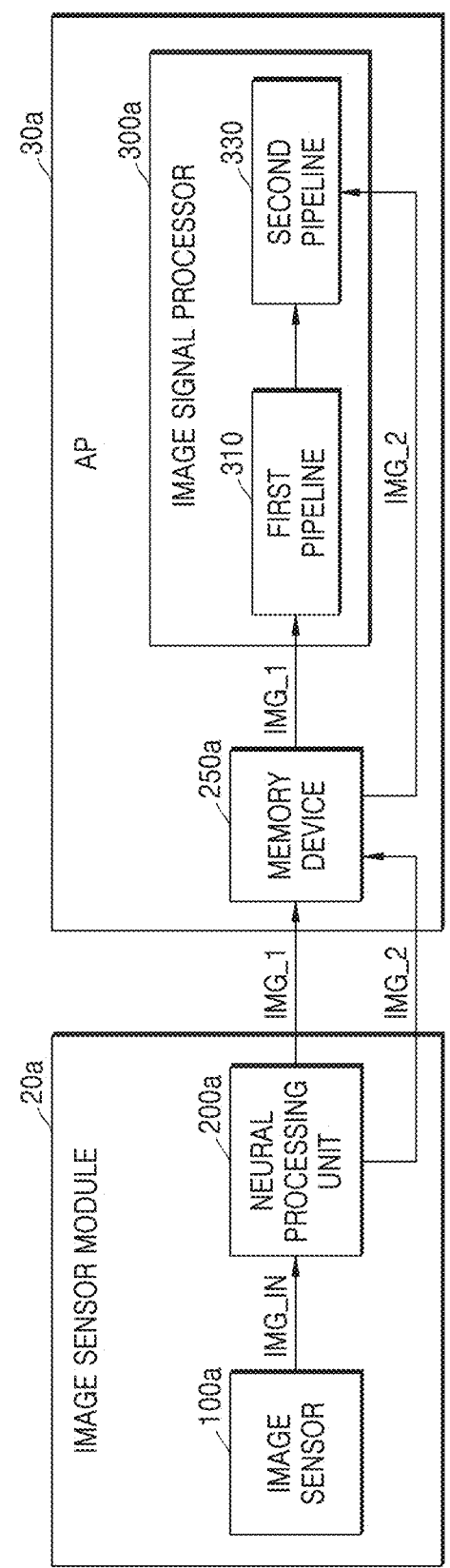
FIG. 2 is a schematic block diagram of an image processing system according to some example embodiments.

FIG. 2 is a schematic block diagram of an image processing system according to some example embodiments.

Referring to FIG. 2, an image processing system 10*a* may include an image sensor module 20*a* and an AP 30*a* processing an image received from the image sensor module 20*a*. The image sensor module 20*a* may include a neural processing unit 200*a*.

According to some example embodiments, the neural processing unit 200*a* may be constituted of a low-complexity network, which converts the input image IMG_IN provided from an image sensor 100*a* into the first image IMG_1 based on the first pattern and generates the second image IMG_2. Accordingly, the amount of operations of the neural processing unit 200*a* may be decreased, and a data transmission bandwidth may be improved. In some example embodiments, the mass and/or foot print of the neural processing unit 200*a* may be reduced due to the decrease in the operational requirements. As the mass of the neural processing unit 200*a* is reduced, the neural processing unit 200*a* may be mounted on the image sensor module 20*a*. The neural processing unit 200*a* included in the image sensor module 20*a* may be called a neural processor, a neural engine, and/or the like.

The neural processing unit 200*a* may be in a stack with a sensor chip of the image sensor 100*a*. For example, the image sensor 100*a* may constitute a first chip, the neural processing unit 200*a* and a control logic (not shown) may constitute a second chip, and the first and second chips may be stacked on each other. However, the embodiments are not limited thereto. In some embodiments, the image sensor 100*a* and the neural processing unit 200*a* may be respectively integrated into different semiconductor chips and electrically connected to each other through a connecting member or a through via.

The AP 30*a* may receive the first image IMG_1 and the second image IMG_2 from the image sensor module 20*a*. The AP 30*a* may further include a memory device 250*a* to increase an image transmission speed. For example, the memory device 250*a* may include dynamic random access memory (DRAM) such as double data rate (DDR) synchronous DRAM (SDRAM), low power DDR (LPDDR) SDRAM, graphic DDR (GDDR) SDRAM, and/or Rambus DRAM (RDRAM).

The memory device 250*a* may receive and store at least one of the first and/or second images IMG_1 and IMG_2 from the image sensor module 20*a*. The memory device 250*a* may provide at least one of the first and second images IMG_1 and IMG_2 to an image signal processor 300*a* in response to a command generated by the AP 30*a*. In some embodiments, the memory device 250*a* may provide the first image IMG_1 to a first pipeline 310 and the second image IMG_2 to a second pipeline 330. However, the embodiments are not limited thereto, and, in some cases neural processing unit 200*a* may by-pass the memory 250*a* (and/or the memory 250*a* may be excluded). In these cases, the first image IMG_1 and/or the second image IMG_2 may be received by the first pipeline 310 and the second pipeline, respectively, directly from the image sensor module 20*a*.

Figure 3:
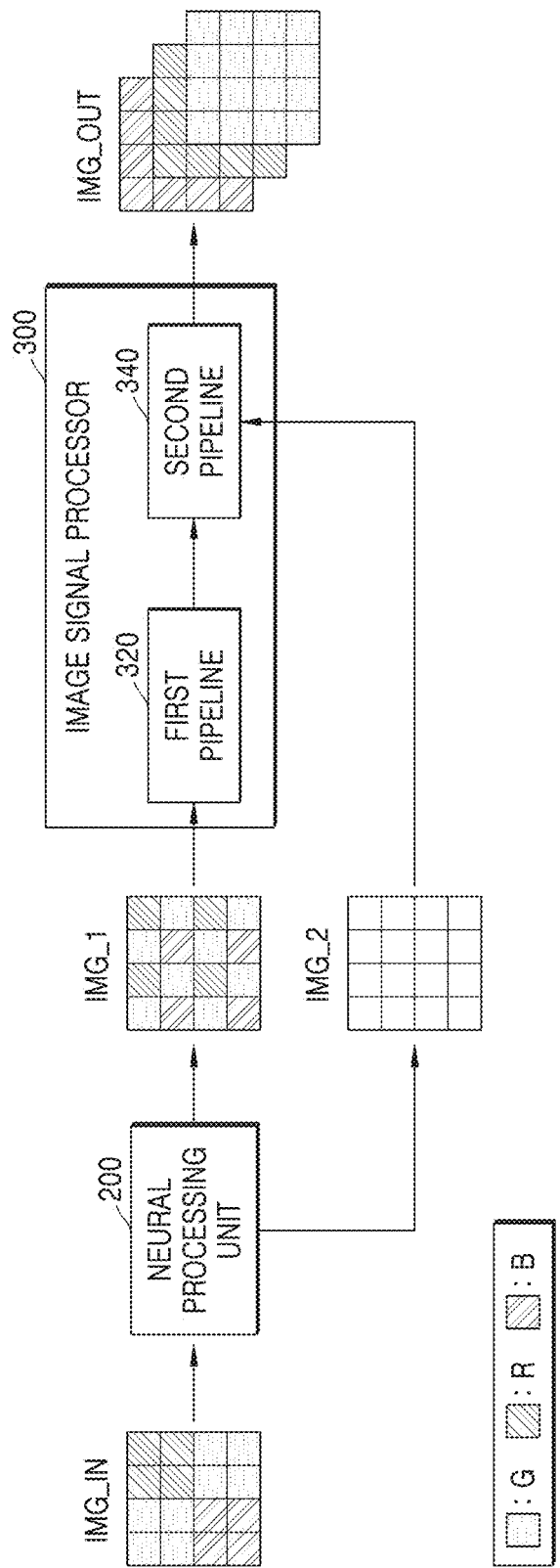
FIG. 3 is a schematic block diagram illustrating image signal processing of an application processor, according to some example embodiments.

FIG. 3 is a schematic block diagram illustrating image signal processing of an AP, according to some example embodiments. For clarity of description, FIG. 3 will be described with reference to FIG. 1, but is not so limited.

Referring to FIG. 3, the image sensor 100 may generate images in various patterns according to the structure of a color filter array. The image sensor 100 may include a color filter array having, for example, a Bayer pattern. The Bayer pattern may include a combination of a red filter, a blue filter, and two green filters, which are arranged in two rows and two columns.

The image sensor 100 may include a color filter array having a pattern modified from the Bayer pattern. For example, the image sensor 100 may include a color filter array having a green filter modified from the Bayer pattern. For example, one of two green filters of the Bayer pattern may be changed to a white filter, and the color filter array may include a combination of a red filter, a blue filter, a green filter, and a white filter. When two green filters of the Bayer pattern are changed to white filters, a color filter array may include a combination of a red filter, a blue filter, and two white filters. A white filter may be called a clear filter, a transparent filter, or the like.

The image sensor 100 may include a color filter array obtained by changing at least one of the color filters of the Bayer pattern to a cyan filter, a magenta filter, and/or a yellow filter. For example, when one and/or two of the green filters of the Bayer pattern are changed to yellow filters, a color filter array may include a combination of a red filter, a blue filter, and one or more yellow filters. Therefore, a color filter array may include a combination of a cyan filter, a magenta filter, and two yellow filters; and/or a color filter array may include a combination of a cyan filter, a magenta filter, a green filter, and/or a yellow filter. The image sensor 100 may generate images in various patterns according to the arrangements of a color filter array.

In some embodiments, the image sensor 100 may include a plurality of pixels, which may include a plurality of adjacent pixels corresponding to the same color. The image sensor 100 may include a color filter array, which includes the same color filters above the adjacent pixels. For example, the image sensor 100 may include a plurality of pixels, which are divided into groups each having four adjacent pixels arranged in two rows and two columns corresponding to the same color. For example, the image sensor 100 may include a plurality of pixels, which are divided into groups each having nine adjacent pixels arranged in three rows and three columns corresponding to the same color. For example, the image sensor 100 may include a plurality of pixels, which are divided into groups each having sixteen adjacent pixels arranged in four rows and four columns corresponding to the same color. The image sensor 100 may generate images in various patterns according to the arrangements of pixels in a matrix.

As shown in FIG. 3, the image sensor 100 may include a plurality of pixels in a matrix. The pixels may be divided into groups each having four adjacent pixels arranged in two rows and two columns corresponding to the same color. For example, the image sensor 100 may include the same color filters respectively above four adjacent pixels in two rows and two columns. However, example embodiments are not limited thereto. For example, the plurality of pixels may be included in a 2-dimensional array and/or one or more of the pixels corresponding to a color (and/or color group) may be included in a stack above and/or below the array. The image sensor 100 may generate an image, in which adjacent pixels represent the same color information, based on the structure of a color filter array. The image generated by the image sensor 100 may be provided, as the input image IMG_IN, to the neural processing unit 200. However, embodiments are not limited thereto. The input image IMG_IN may have various patterns according to the arrangements of a color filter array.

The neural processing unit 200 may convert the input image IMG_IN into the first image IMG_1 in the first pattern. In some embodiments (e.g., when the image signal processor 300 processes an image in the Bayer pattern) the neural processing unit 200 may convert the input image IMG_IN into the first image IMG_1 in the Bayer pattern. For example, four adjacent pixels corresponding to the same color in the input image IMG_IN may be converted into a combination of two green pixels G, a red pixel R, and a blue pixel B. However, embodiments are not limited thereto. The neural processing unit 200 may convert the input image IMG_IN into an image in one of various patterns processed by the image signal processor 300.

The neural processing unit 200 may generate the second image IMG_2 from the input image IMG_IN. The second image IMG_2 may include information for compensating for a data loss area, which may be caused by converting the input image IMG_IN into the first image IMG_1 in the Bayer pattern. For example, the second image IMG_2 may represent luminance information regarding the input image IMG_IN.

In some embodiments, the image signal processor 300 may include a plurality of pipelines. For example, the image signal processor 300 may include at least a first pipeline 320 and a second pipeline 340. The first pipeline 320 may receive the first image IMG_1 and perform image signal processing on the first image IMG_1. The second pipeline 340 may receive the second image IMG_2 and correct the first image IMG_1. For example, the second pipeline 340 may apply filtering to an image, which is output from the first pipeline 320, based on the luminance information of the second image IMG_2. Accordingly, the image signal processor 300 may generate an output image IMG_OUT having similar image quality to the input image IMG_IN. According to some example embodiments, the image signal processor 300 may generate the output image IMG_OUT having a similar peak signal-to-noise ratio (PSNR) and/or structural similarity (SSIM) to the input image IMG_IN.

Figure 4:
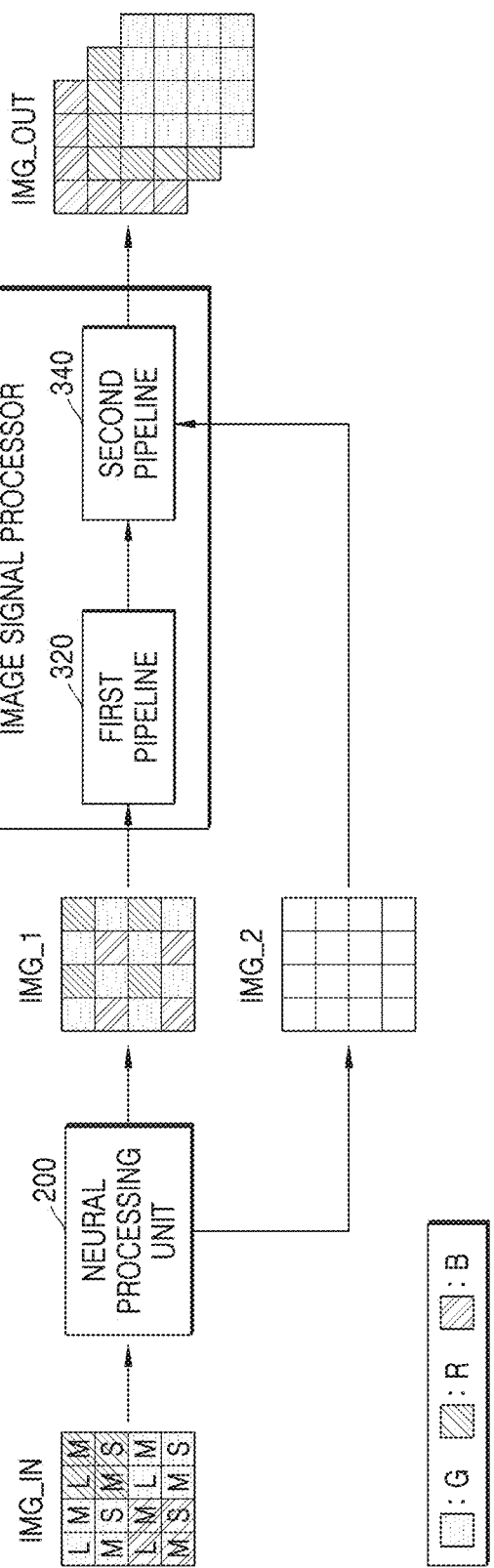
FIG. 4 is a schematic block diagram illustrating image signal processing of an application processor, according to some example embodiments.

FIG. 4 is a schematic block diagram illustrating image signal processing of an AP, according to some example embodiments. For clarity of description, FIG. 4 will be described with reference to FIG. 1, but is not so limited.

Referring to FIG. 4, the image sensor 100 may generate images in various patterns according to the combinations of pixels having different exposure times. For example, a plurality of pixels may include a combination of a pixel S that has a short exposure time and is exposed to light for a time shorter than a reference time, a pixel L that has a long exposure time and is exposed to light for a time longer than the reference time, and pixels M that have a mid-exposure time and are exposed to light for an average and/or intermediate time.

As shown in FIG. 4, the same color pixels may be provided above four adjacent pixels, and different exposure times may be set for the four adjacent pixels. For example, four adjacent pixels may include one pixel S having a short exposure time, two pixels M having a mid-exposure time, and one pixel L having a long exposure time. The image sensor 100 may generate an image including different dynamic ranges, according to the exposure times of a plurality of pixels. The image generated by the image sensor 100 may be provided, as the input image IMG_IN, to the neural processing unit 200. However, embodiments are not limited thereto. The input image IMG_IN may have various patterns according to exposure time differences among a plurality of pixels.

The neural processing unit 200 may convert the input image IMG_IN into the first image IMG_1 in the first pattern. In some embodiments, when the image signal processor 300 processes an image in the Bayer pattern, the neural processing unit 200 may convert the input image IMG_IN into the first image IMG_1 in the Bayer pattern. For example, four adjacent pixels having different dynamic ranges in the input image IMG_IN may be converted into a combination of two green pixels G, a red pixel R, and a blue pixel B. However, embodiments are not limited thereto. The neural processing unit 200 may convert the input image IMG_IN into an image in one of various patterns processed by the image signal processor 300.

Figure 5:
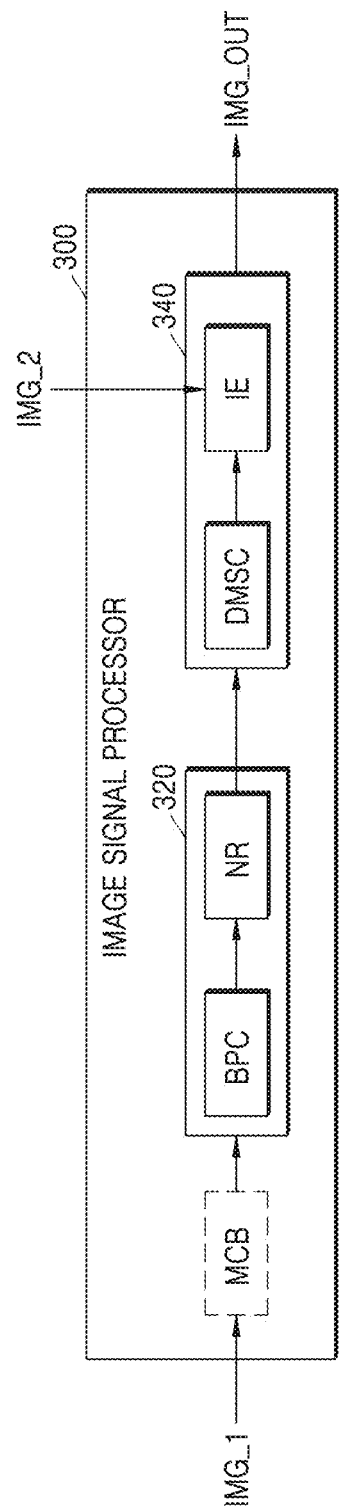
FIG. 5 is a schematic block diagram illustrating image signal processing of an image signal processor, according to some example embodiments.

FIG. 5 is a schematic block diagram illustrating image signal processing of an image signal processor, according to an example embodiment.

Referring to FIG. 5, the image signal processor 300 may include a plurality of pipelines (e.g., the first and second pipelines 320 and 340), each of which may include at least one image signal processing module.

In some embodiments, the image signal processor 300 may include a multi-cell binning unit MCB. The multi-cell binning unit MCB may be controlled by the image signal processor 300 to be turned on and/or off according to the type (e.g., a still image and/or a video) of image received by the image signal processor 300. For example, when the input data is a still image, the multi-cell binning unit MCB may be turned off and not operate. When the input data is a video, the multi-cell binning unit MCB may be turned on and operate.

The image signal processor 300 may include the first pipeline 320. The first pipeline 320 may receive and perform image signal processing on the first image IMG_1. For example, the first pipeline 320 may include a bad pixel corrector BPC and a noise rejecter NR. The bad pixel corrector BPC may correct a defective pixel such as a dead pixel and/or a hot pixel (which may be caused by a manufacturing process) in the first image IMG_1. The bad pixel corrector BPC may correct a pixel value, which corresponds to a bad pixel in the first image IMG_1, based on pixel values of pixels adjacent to the bad pixel. The noise rejecter NR may correct a pixel value, which corresponds to a pixel including noise, based on pixel values of pixels adjacent to the pixel including noise, by using a filter (e.g., a Gaussian filter) suitable for the type of noise.

The image signal processor 300 may further include the second pipeline 340. The second pipeline 340 may be connected to the back end of the first pipeline 320 and perform image signal processing on an image output from the first pipeline 320. For example, the second pipeline 340 may include an RGB converter DMSC and an image quality improver IE. As shown in FIG. 5, the RGB converter DMSC may be, for example, a device management security controller (DMSC), but the example embodiments are not so limited. The RGB converter DMSC may perform color interpolation on adjacent pixels in an image output from the first pipeline 320 and generate an RGB image in which each pixel includes all color information of red, green, and blue. The image quality improver IE may apply filtering to the RGB image, which is generated by the RGB converter DMSC, based on the second image IMG_2. For example, the image quality improver IE may perform sharpening on the RGB image based on luminance information represented by the second image IMG_2.

However, embodiments are not limited thereto. For example, one of the image signal processing modules described above may be omitted from the first pipeline 320 and/or the second pipeline 340 and/or the first pipeline 320 and/or the second pipeline 340 may further include another image signal processing module in addition those described above.

Figure 6:
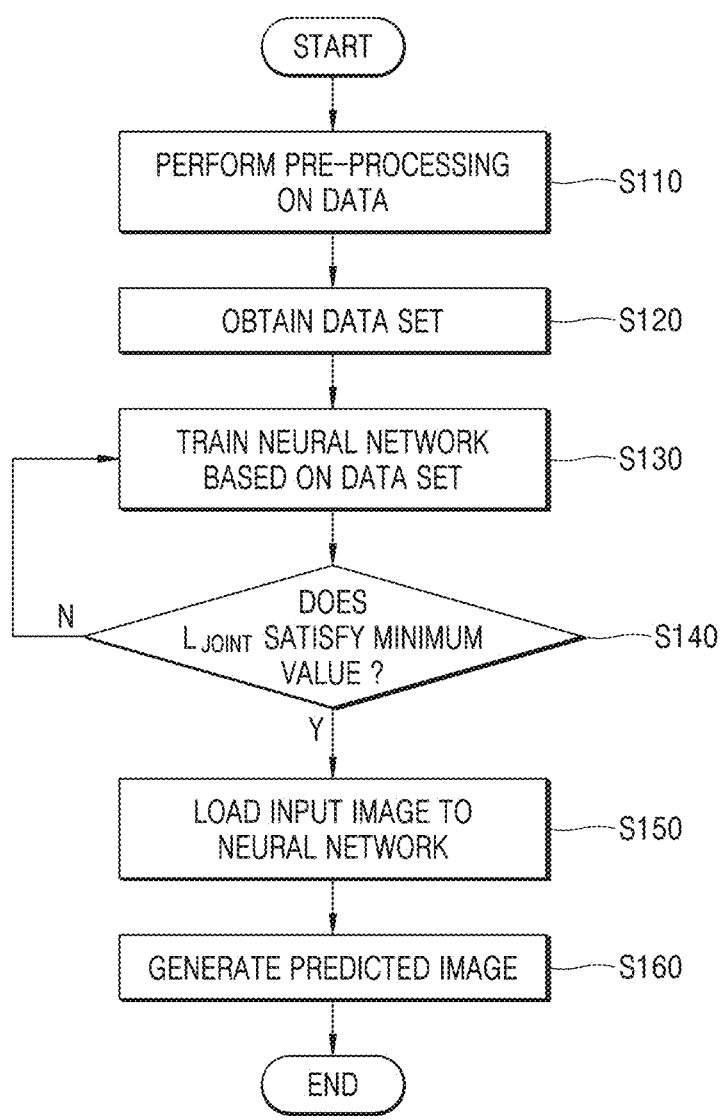
FIG. 6 is a flowchart of a method, performed by a neural processing unit, of training a neural network, according to some example embodiments.

FIG. 6 is a flowchart of a method, performed by a neural processing unit, of training a neural network, according to some example embodiments.

Referring to FIG. 6, the neural processing unit may generate a neural network constituted of a plurality of parameters. For example, neural networks may include various kinds of networks, such as a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like.

The neural processing unit may perform a pre-processing operation on the image data (e.g., training data) in operation S110. For example, the neural processing unit may increase the amount of limited image data by cropping a pixel at a certain position in the image data, rotating the image data by a certain angle, and/or flipping the image data. In some embodiments, the neural processing unit may variously change the image data by adding noise (e.g., Gaussian random noise) to the image data.

The neural processing unit may obtain a data set generated through the pre-processing, which is performed in operation S110, in operation S120. The data set may be used as an original image (e.g., which represents a ground truth) in training a neural network. For example, an original image of a Bayer pattern, an original image representing luminance information, and/or an original image from which noise has been removed may be generated from the data set. The data set may include an RGB image, in which each of a plurality of pixels includes all color information of red, green, and blue. The original image of a Bayer pattern may be generated by sampling color information corresponding to the Bayer pattern from the RGB image. The original image representing luminance information may be generated by performing an operation of sampling the luminance information from the RGB image. The original image, from which noise has been removed, may be generated by applying a noise rejection filter to the RGB image.

The neural processing unit may train a neural network using the data set in operation S130. The neural network may complete a cycle of learning of the entire data set based on set parameters.

The neural processing unit may evaluate the training of the neural network, which has been performed in operation S130, based on a loss function $L_{JOINT}$ in operation S140. The loss function $L_{JOINT}$ may be used as an indicator for determining optimal parameters during the training of the neural network. When the loss function $L_{JOINT}$ does not satisfy a minimum value in operation S140 (e.g., in case of NO), the parameters of the neural network may be updated such that the loss function $L_{JOINT}$ is decreased, and operation S130 may be repeated. When the loss function $L_{JOINT}$ satisfies the minimum value in operation S140 (e.g., in case of YES), the optimal parameters of the neural network are determined, and the training of the neural network may be completed.

The neural processing unit may load an input image to the trained neural network in operation S150. The input image may include various patterns due to a change in the arrangement of a color filter array and/or an exposure time difference between pixels.

The trained neural network may generate a predicted image from the various patterns of the input image in operation S160. In some embodiments, the neural network may be implemented as a simple network, which converts the input image into a first image in a Bayer pattern and generates a second image for compensating for the conversion. For example, the second image may be used to compensate for artifacts (e.g., Moiré, false color, zippering, and/or the like) created during the conversion of the input image into the first image.

Figure 7:
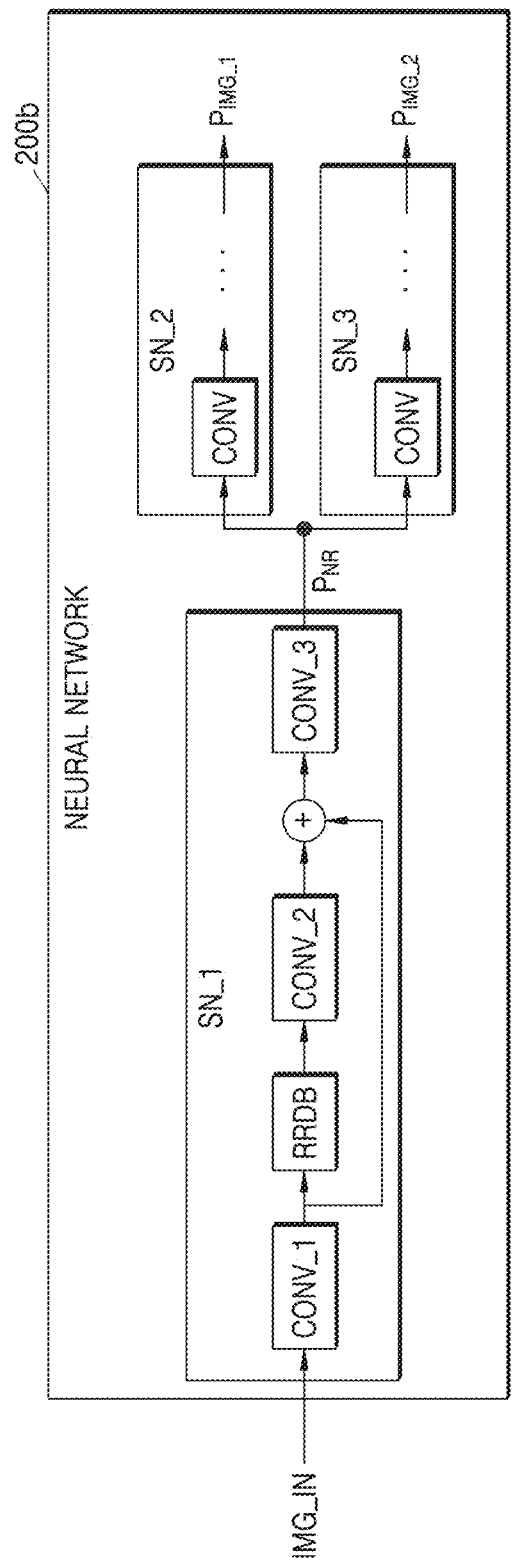
FIG. 7 is a block diagram of the configuration of a neural network according to some example embodiments.

FIG. 7 is a block diagram of the configuration of a neural network according to some example embodiments.

Referring to FIG. 7, the neural network may include a plurality of sub networks SN_1, SN_2, and SN_3. A sub network may learn a feature map based on an input image and/or a predicted image output from the sub network. For example, the feature map may be based on a loss function. Thereby the plurality of subnetworks SN_1, SN_2, and/or SN_3 may output an image corresponding to the feature map from the input image. The feature map may also be referred to as an activation map.

In some embodiments, the neural network may include at least one selected from a first sub network SN_1, a second sub network SN_2, and a third sub network SN_3, but the embodiments are not limited thereto. The first sub network SN_1 may be trained to remove noise from the input image IMG_IN. The first sub network SN_1 may include a plurality of blocks (and/or layers), and each of the blocks (and/or layers) may use, as input data, data output from a previous block (and/or layer). The first sub network SN_1 may generate a predicted image $P_{NR}$ from the input image IMG_IN.

In some embodiments, the blocks (and/or layers) the first sub network SN_1 may include a first convolution block CONV_1, a residual in residual dense block RRDB, a second convolution block CONV_2, and a third convolution block CONV_3. In some embodiments, the first sub network SN_1 may include blocks connected to each other via skip connection. For example, data output from the first convolution block CONV_1 may not pass through the residual in residual dense block RRDB and/or the second convolution block CONV_2, but be used as input data of the third convolution block CONV_3. However, embodiments are not limited thereto. Some of the blocks of the first sub network SN_1 may be omitted and/or blocks (and/or layers) may be added. The first sub network SN_1 may further include a convolution layer, a pooling layer, an activation layer, and/or a full-connected layer. The first sub network SN_1 may be trained based on a loss function $L_{NR}$ expressed as Equation 1. The first sub network SN_1 may be trained such that a difference between a noise-removed original image $RGB_{gt}$ and the predicted image $P_{NR}$ generated by the first sub network SN_1 is decreased.

$$L_{NR}=\|P_{NR}-RGB_{gt}\|^2 \quad \text{[Equation 1]}$$

The second sub network SN_2 may be trained to receive the predicted image $P_{NR}$ from the first sub network SN_1 and convert the predicted image $P_{NR}$ into a Bayer-pattern image. For example, the second sub network SN_2 may include at least one convolution block. The second sub network SN_2 may generate a predicted image $P_{IMG\_1}$ from the predicted image $P_{NR}$ output from the first sub network SN_1. The second sub network SN_2 may be trained based on a loss function $L_{IMG\_1}$ expressed as Equation 2. The second sub network SN_2 may be trained such that a difference between a Bayer-pattern original image $BAYER_{gt}$ and the predicted image $P_{IMG\_1}$ generated by the second sub network SN_2 is decreased.

$$L_{IMG\_1}=\|P_{IMG\_1}-BAYER_{gt}\|^2 \quad \text{[Equation 2]}$$

The third sub network SN_3 may be trained to generate an image, which represents luminance information, from the predicted image $P_{NR}$ output from the first sub network SN_1. For example, the third sub network SN_3 may include at least one convolution block. The third sub network SN_3 may generate a predicted image $P_{IMG\_2}$ from the predicted image $P_{NR}$ generated by the first sub network SN_1. The third sub network SN_3 may be trained based on a loss function $L_{IMG\_2}$ expressed as Equation 3. The third sub network SN_3 may be trained such that a difference between an original image $luminance_{gt}$ and the predicted image $P_{IMG\_2}$ generated by the third sub network SN_3 is decreased.

$$L_{IMG\_2}=\|P_{IMG\_2}-luminance_{gt}\|^2 \quad \text{[Equation 3]}$$

The neural network may be trained based on the loss function $L_{JOINT}$ constituted of the loss function $L_{NR}$ of the first sub network SN_1, the loss function $L_{IMG\_1}$ of the second sub network SN_2, and the loss function $L_{IMG\_2}$ of the third sub network SN_3, as shown in Equation 4. A neural processing unit may adjust a weight for a loss function applied to each sub network by adjusting a hyper parameter $\lambda_{NR}$ or $\lambda_{IMG\_2}$ according to a sub network.

$$L_{JOINT}=L_{IMG\_1}\lambda_{IMG\_2}*L_{IMG\_2}+\lambda_{NR}*L_{NR} \quad \text{[Equation 4]}$$

Figure 8:
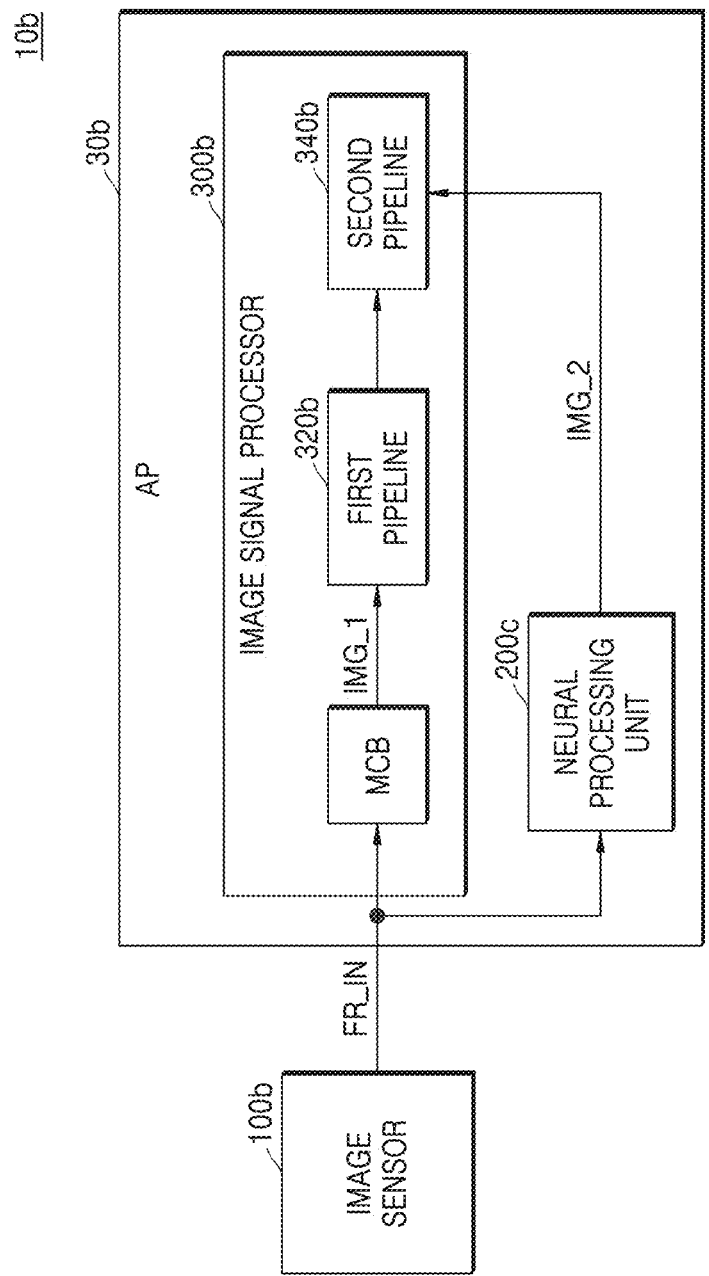
FIG. 8 illustrates a video processing system according to some example embodiments.

FIG. 8 illustrates an image processing system according to some example embodiments.

Referring to FIG. 8, a video processing system 10b may include an image sensor 100b and an AP 30b processing a video received from the image sensor 100b. The AP 30b may change an operation mode by controlling an image signal processing module to be turned on or off according to the type (e.g., an image or a video) of input data.

In some embodiments, the image sensor 100b may generate frame images constituting a video. Each of the frame images generated by the image sensor 100b may be provided to the AP 30b as an input image FR_IN. The AP 30b may perform image signal processing on the input image FR_IN provided from the image sensor 100b. Because of the characteristic of a video required to be processed quickly, the AP 30b may turn on the multi-cell binning unit MCB.

The multi-cell binning unit MCB included in an image signal processor 300b may receive the input image FR_IN. In some embodiments, the multi-cell binning unit MCB may convert the input image FR_IN into the first image IMG_1 in a Bayer pattern by summing a plurality of pixel signals corresponding to the same color. Compared to an operation of the neural processing unit 200 converting the input image IMG_IN based on a neural network, which has been described above with reference to FIGS. 1 through 6, the multi-cell binning unit MCB performs a simple operation, and accordingly, a video processing delay may be reduced.

A neural processing unit 200c may receive the input image FR_IN and generate the second image IMG_2 representing luminance information. The operation of the neural processing unit 200c generating the second image IMG_2 may be performed in parallel with the operation of the image signal processor 300b converting the input image FR_IN into the first image IMG_1 in a Bayer pattern and an operation of a first pipeline 320b performing image signal processing on the first image IMG_1. Accordingly, the second image IMG_2 is provided to a second pipeline 340b when the second pipeline 340b starts to operate, and therefore, a video processing delay may be reduced.

Figure 9:
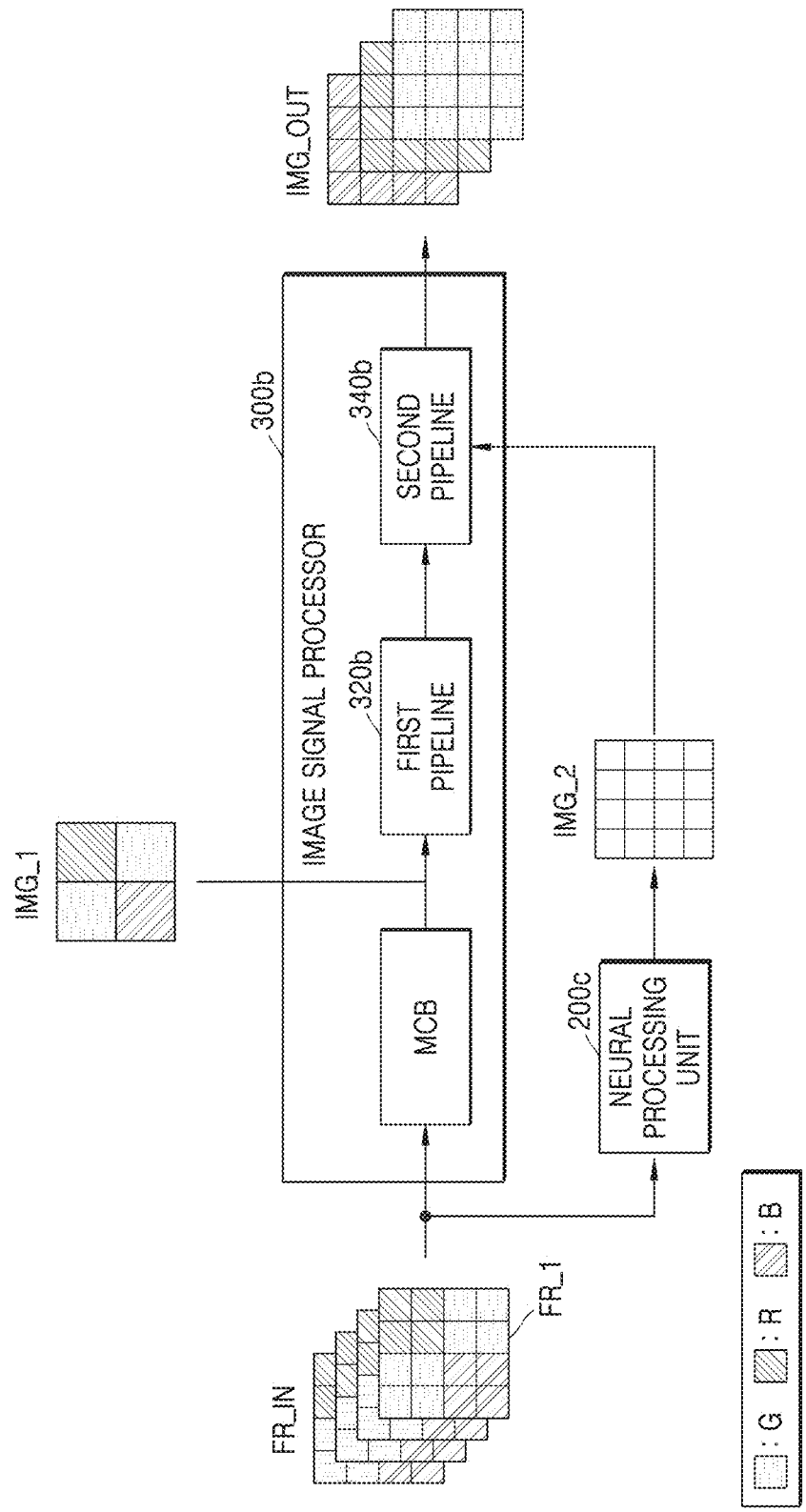
FIG. 9 illustrates a video processing system according to some example embodiments.

FIG. 9 illustrates a video processing system according to an example embodiment.

Referring to FIG. 9, an image sensor may generate frame images constituting a video. Each of the frame images generated by the image sensor may be provided as the input image FR_IN. For example, the image sensor may generate an image, in which four adjacent pixels represent the same color information in correspondence to the structure of a color filter array. The frame images constituting the video may be sequentially provided to the neural processing unit 200c and the image signal processor 300b.

In some embodiments, a first frame image FR_1 may be provided to the multi-cell binning unit MCB of the image signal processor 300b. The multi-cell binning unit MCB may generate the first image IMG_1 in a Bayer pattern by summing a plurality of pixel signals corresponding to the same color information in the first frame image FR_1. For example, the multi-cell binning unit MCB may generate a green pixel in the Bayer pattern by summing pixel signals respectively output from four pixels corresponding to green G in the first frame image FR_1. The multi-cell binning unit MCB may generate a red pixel in the Bayer pattern by summing pixel signals respectively output from four pixels corresponding to red R in the first frame image FR_1. The multi-cell binning unit MCB may generate a blue pixel in the Bayer pattern by summing pixel signals respectively output from four pixels corresponding to blue B in the first frame image FR_1.

The first frame image FR_1 may also be provided to the neural processing unit 200c. The neural processing unit 200c may generate the second image IMG_2 representing luminance information regarding the first frame image FR_1. The operation of the neural processing unit 200c generating the second image IMG_2 may be performed in parallel with the operation of converting the first frame image FR_1 into the first image IMG_1 in a Bayer pattern and an operation of the first pipeline 320b performing image signal processing on the first image IMG_1.

The second pipeline 340b may generate an RGB image by performing color interpolation on an image output from the first pipeline 320b. The second pipeline 340b may apply filtering to the RGB image based on the second image IMG_2. However, example embodiments are not limited thereto. The second pipeline 340b may not perform part of image signal processing. Alternatively, the second pipeline 340b may further perform image restoration based on inter-frame information or convert an RGB image into a YUV image.

Figure 10:
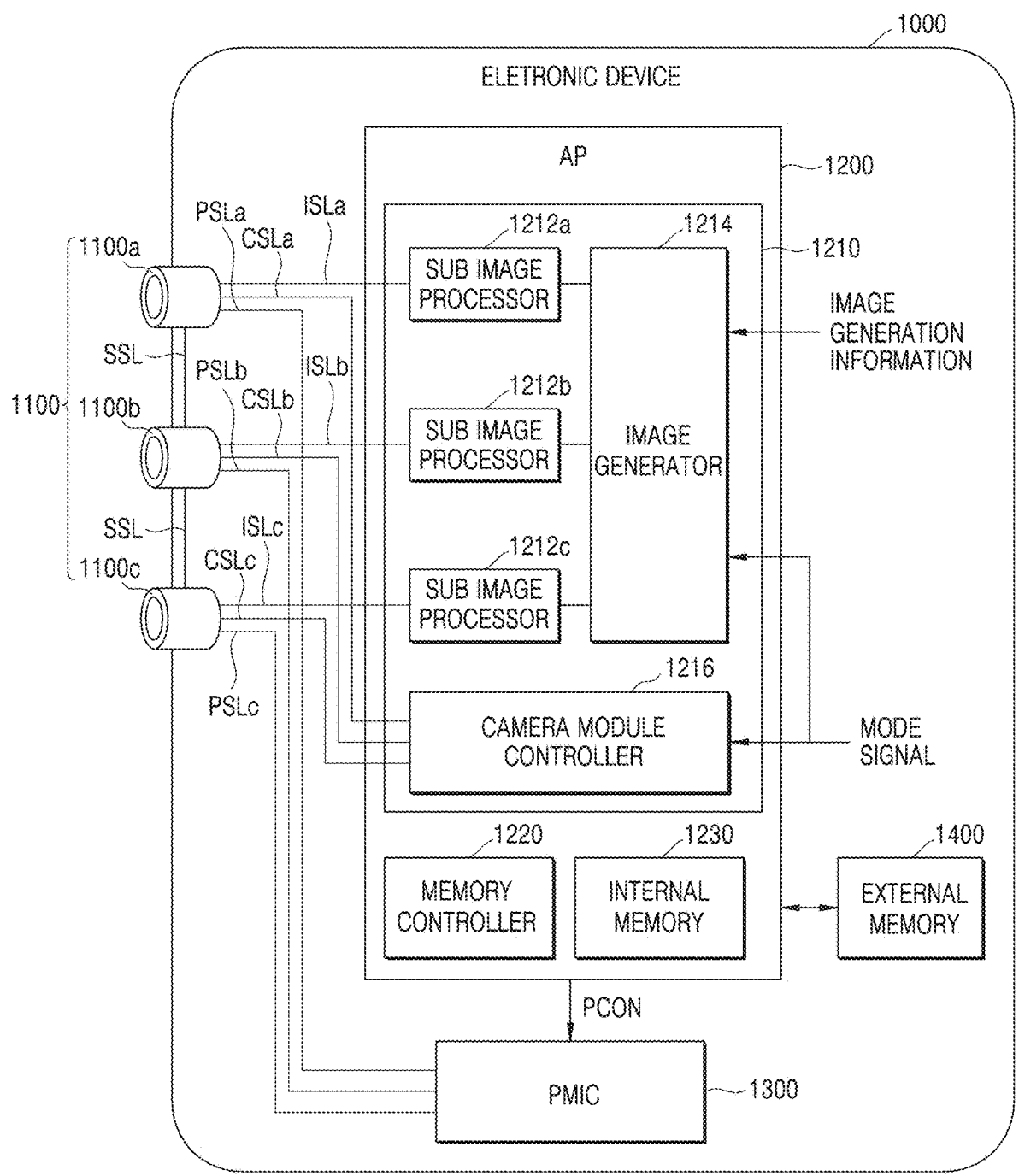
FIG. 10 is a block diagram of an electronic device including a multi-camera module, according to some example embodiments.

FIG. 10 is a block diagram of an electronic device including a multi-camera module, according to some example embodiments.

Referring to FIG. 10, an electronic device 1000 may include a camera module group 1100, an AP 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 11, example embodiments are not limited thereto. For example, the number of camera modules in the plurality of camera modules may be greater than or less than the three camera modules 1100a, 1100b, and 1100c illustrated in FIG. 10. In some embodiments, the camera module group 1100 may be modified to include only two camera modules or "n" camera modules, where "n" is a natural number of at least 4.

An image-processing unit 1210 may include a plurality of sub image processors 1212a, 1212b, and 1212c, an image generator 1214, and a camera module controller 1216.

The image-processing unit 1210 may include as many sub image processors 1212a, 1212b, and 1212c as the camera modules 1100a, 1100b, and 1100c.

For example, image data generated from the camera module 1100a may be provided to the sub image processor 1212a through an image signal line ISLa; image data generated from the camera module 1100b may be provided to the sub image processor 1212b through an image signal line ISLb; and image data generated from the camera module 1100c may be provided to the sub image processor 1212c through an image signal line ISLc. Such image data transmission may be performed using, for example, a mobile industry processor interface (MIPI) based camera serial interface (CSI), but the example embodiments are not limited thereto.

In some embodiments, a single sub image processor may be provided for a plurality of camera modules. For example, differently from FIG. 10, the sub image processors 1212a and 1212c may not be separated but may be integrated into a single sub image processor, and the image data provided from the camera module 1100a and/or the camera module 1100c may be selected by a selection element (e.g., a multiplexer) and then provided to the integrated sub image processor. In these cases, the sub image processor 1212b may not be integrated and may be provided with image data from the camera module 1100b.

As noted above, in some embodiments, image data generated from the camera module 1100a may be provided to the sub image processor 1212a through the image signal line ISLa, image data generated from the camera module 1100b may be provided to the sub image processor 1212b through the image signal line ISLb, and image data generated from the camera module 1100c may be provided to the sub image processor 1212c through the image signal line ISLc. In some embodiments, the image data processed by the sub image processor 1212b may be directly provided to the image generator 1214, and either the image data processed by the sub image processor 1212a or the image data processed by the sub image processor 1212c may be selected by a selection element (e.g., a multiplexer) and then provided to the image generator 1214.

Each of the sub image processors 1212a, 1212b, and 1212c may perform image processing, such as a bad pixel correction, 3A adjustment (e.g., autofocus correction, auto-white balance, and auto-exposure), noise reduction, sharpening, gamma control, and/or re-mosaic, on image data provided from a corresponding one of the camera modules 1100a, 1100b, and 1100c.

In some embodiments, mosaic (and/or re-mosaic) signal processing may be performed by each of the camera modules 1100a, 1100b, and 1100c, and a processing result may be provided to each of the sub image processors 1212a, 1212b, and 1212c.

The image data processed by each of the sub image processors 1212a, 1212b, and 1212c may be provided to the image generator 1214. The image generator 1214 may generate an output image using the image data provided from each of the sub image processors 1212a, 1212b, and 1212c according to image generation information or a mode signal.

For example, the image generator 1214 may generate the output image by merging at least portions of respective pieces of image data, which are respectively generated from the sub image processors 1212a, 1212b, and 1212c, according to the image generation information or the mode signal. Alternatively, the image generator 1214 may generate the output image by selecting one of pieces of image data, which are respectively generated from the sub image processors 1212a, 1212b, and 1212c, according to the image generation information and/or the mode signal.

In some embodiments, the image generation information may include a zoom signal and/or a zoom factor. In some embodiments, the mode signal may be based on a mode selected by a user.

When the image generation information includes a zoom signal and/or a zoom factor and the camera modules 1100a, 1100b, and 1100c have different field-of-views, the image generator 1214 may perform different operations according to different kinds of zoom signals. For example, when the zoom signal is a first signal, the image generator 1214 may generate an output image using the image data output from the sub image processor 1212a and the image data output from the sub image processor 1212b between the image data output from the sub image processor 1212a and the image data output from the sub image processor 1212c. When the zoom signal is a second signal different from the first signal, the image generator 1214 may generate an output image using the image data output from the sub image processor 1212c and the image data output from the sub image processor 1212b between the image data output from the sub image processor 1212a and the image data output from the sub image processor 1212c. When the zoom signal is a third signal different from the first signal and the second signal, the image generator 1214 may generate an output image by selecting one of the pieces of image data respectively output from the sub image processors 1212a, 1212b, and 1212c, instead of performing the merging. However, the example embodiments are not limited thereto, and a method of processing image data may be changed.

At this time, image processing such as demosaic, down scaling to a video/preview resolution, gamma correction, and/or high dynamic range (HDR) processing, may be performed by the sub image processors 1212a, 1212b, and 1212c, and processed image data may be transmitted to the image generator 1214. Accordingly, although the processed image is provided from a selector to the image generator 1214 through a single signal line, the image merging operation of the image generator 1214 may be performed at a high speed.

In some embodiments, the image generator 1214 may receive a plurality of pieces of image data, which have different exposure times, from at least one of the sub image processors 1212a, 1212b, and 1212c and perform HDR processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through a corresponding one of control signal lines CSLa, CSLb, and CSLc, which are separated from one another.

One (e.g., the camera module 1100b) of the camera modules 1100a, 1100b, and 1100c may be designated as a master (e.g., primary) camera according to the mode signal and/or the image generation signal including a zoom signal, and the other camera modules (e.g., 1100a and 1100c) may be designated as slave (e.g., secondary) cameras. Such designation information may be included in a control signal and provided to each of the camera modules 1100a, 1100b, and 1100c through a corresponding one of the control signal lines CSLa, CSLb, and CSLc, which are separated from one another.

The camera modules operating as masters and/or slaves may be changed according to a zoom factor or an operation mode signal. For example, when the field-of-view of the camera module 1100a is greater than that of the camera module 1100b and the zoom factor indicates a low zoom ratio, the camera module 1100a may operate as a master and the camera module 1100b may operate as a slave. Contrarily, when the zoom factor indicates a high zoom ratio, the camera module 1100b may operate as a master and the camera module 1100a may operate as a slave.

In some embodiments, a control signal provided from the camera module controller 1216 to each of the camera modules 1100a, 1100b, and 1100c may include a sync enable signal. For example, when the camera module 1100b is a master camera and the camera module 1100a is a slave camera, the camera module controller 1216 may transmit the sync enable signal to the camera module 1100b. The camera module 1100b provided with the sync enable signal may generate a sync signal based on the sync enable signal and may provide the sync signal to the camera modules 1100a and 1100c through a sync signal line SSL. The camera modules 1100a, 1100b, and/or 1100c may be synchronized with the sync signal and may transmit image data to the AP 1200.

In some embodiments, a control signal provided from the camera module controller 1216 to each of the camera modules 1100a, 1100b, and 1100c may include mode information according to the mode signal. The camera modules 1100a, 1100b, and 1100c may operate in a first operation mode or a second operation mode in relation with a sensing speed based on the mode information.

In the first operation mode, the camera modules 1100a, 1100b, and 1100c may generate an image signal at a first speed (e.g., at a first frame rate), encode the image signal at a second speed higher than the first speed (e.g., at a second frame rate higher than the first frame rate), and transmit an encoded image signal to the AP 1200. At this time, the second speed may be at most 30 times the first speed.

The AP 1200 may store the received image signal (e.g., the encoded image signal) in an internal memory 1230 and/or the external memory 1400. For example, in some embodiments, the AP 1200 may include a memory controller 1220, which controls access to and/or operations of the internal memory 1290 and/or the external memory 1400. Thereafter, the AP 1200 may read the encoded image signal from the internal memory 1230 and/or the external memory 1400, decode the encoded image signal, and display image data generated based on a decoded image signal. For example, a corresponding one of the sub image processors 1212a, 1212b, and 1212c of the image-processing unit 1210 may perform the decoding and/or may perform image processing on the decoded image signal.

In the second operation mode, the camera modules 1100a, 1100b, and 1100c may generate an image signal at a third speed lower than the first speed (e.g., at a third frame rate lower than the first frame rate) and transmit the image signal to the AP 1200. The image signal provided to the AP 1200 may have not been encoded. The AP 1200 may perform image processing on the image signal and/or store the image signal in the internal memory 1230 or the external memory 1400.

The PMIC 1300 may provide power (e.g., a supply voltage) to each of the camera modules 1100a, 1100b, and 1100c. For example, under the control of the AP 1200, the PMIC 1300 may provide first power to the camera module 1100a through a power signal line PSLa, second power to the camera module 1100b through a power signal line PSLb, and third power to the camera module 1100c through a power signal line PSLc.

The PMIC 1300 may generate power corresponding to each of the camera modules 1100a, 1100b, and 1100c and adjust the level of the power, in response to a power control signal PCON from the AP 1200. The power control signal PCON may include a power adjustment signal for each operation mode of the camera modules 1100a, 1100b, and 1100c. For example, the operation mode may include a low-power mode. At this time, the power control signal PCON may include information about a camera module to operate in the low-power mode and a power level to be set. The same or different levels of power may be respectively provided to the camera modules 1100a, 1100b, and 1100c. The level of power may be dynamically changed.

While the inventive concepts have been particularly shown and described with reference to embodiments thereof, it will be understood that various changes in form and details may be made therein without departing from the spirit and scope of the following claims.

What is claimed is:

1. An application processor comprising:
   a neural processing unit configured to convert an input image into a first image based on a first pattern and generate a second image using a neural network, the second image compensating for the conversion; and
   an image signal processor including a plurality of pipelines configured to perform image signal processing, the plurality of pipelines including at least a first pipeline configured to receive the first image and a second pipeline configured to receive the second image,
   wherein the second pipeline is connected to a back end of the first pipeline such that the second pipeline is configured to receive an output of the first pipeline, and
   wherein the second pipeline is configured to compensate for data lost about the input image due to converting the input image into the first image, and the compensating is based on the second image.

2. The application processor of claim 1, wherein
   the first pattern includes a Bayer pattern, and
   the input image has a second pattern different from the first pattern.

3. The application processor of claim 1, wherein the second image represents luminance information of the input image.

4. The application processor of claim 1, wherein
   the first pipeline is configured to output an image by performing the image signal processing on the first image; and
   the second pipeline is configured to generate a third image, of a red, green, blue (RGB) type, by performing color interpolation on the image output from the first pipeline.

5. The application processor of claim 4, wherein the second pipeline is further configured to apply filtering to the third image based on the second image.

6. The application processor of claim 4, wherein the first pipeline is configured to perform at least one of removing noise from the first image or detecting a bad pixel in the first image.

7. The application processor of claim 1, wherein the neural network includes a sub network configured to learn a feature map based on the input image and a predicted image, and to output an image corresponding to the feature map.

8. The application processor of claim 7, wherein
   the feature map is based on a loss function including a difference value between an original image in the first pattern and the predicted image, and
   the sub network is further configured to be trained based on the loss function and to output the first image from the input image.

9. The application processor of claim 7, wherein
   the feature map is based on a loss function including a difference value between an original image representing luminance information and the predicted image, and
   the sub network is further configured to be trained based on the loss function and to output the second image from the input image.

10. The application processor of claim 7, wherein
    the feature map is based on a loss function including a difference value between a noise removed original image and the predicted image, and
    the sub network is further configured to be trained based on the loss function and to output a noise-removed image from the input image.

11. The application processor of claim 1, further comprising:
    a memory device configured to receive at least one of the first image or the second image from the neural processing unit and to transmit the at least one of the first image and the second image to the image signal processor.

12. An image processing system comprising:
    an image sensor including a plurality of pixels divided into groups, each of the groups including four adjacent pixels corresponding to a same color; and
    the application processor of claim 1,
    wherein the input image is provided to the neural processing unit from the image sensor.

13. An application processor comprising:
    a neural processing unit configured to generate a first image from an input video using a neural network, the input video being provided from an image sensor and including a plurality of frames, and the first image representing information regarding the plurality of frames; and
    an image signal processor configured to convert at least one of the plurality of frames into a second image based a Bayer pattern and to perform image signal processing on the second image,
    wherein the image signal processing includes compensating for data lost about the input image due to converting the at least one of the plurality of frames into the second image, and the compensating is based on the first image.

14. The application processor of claim 13, wherein the information regarding the plurality of frames represents luminance information of the plurality of frames.

15. The application processor of claim 13, wherein the image sensor includes a plurality of pixels divided into groups having four adjacent pixels corresponding to a same color.

16. The application processor of claim 15, wherein the second image is generated by summing image signals respectively generated by the four adjacent pixels included in the plurality of frames.

17. The application processor of claim 13, wherein the image signal processor is further configured to perform color interpolation on adjacent pixels in the second image such that a third image of a red, green, blue (RGB) type is generated and to apply filtering to the third image based on the first image.

18. An operating method of an application processor, the operating method comprising:
receiving an input image;
converting the input image into a first image based on a Bayer pattern using a neural network;
generating a second image using the neural network, the second image compensating for the conversion; and
performing image signal processing on the first image,
wherein performing the image signal processing includes compensating for data lost about the input image due to converting the input image into the first image, and the compensating is based on the second image.

19. The operating method of claim 18, wherein
the second image represents luminance information regarding the input image, and
the performing of the image signal processing on the first image includes performing color interpolation on adjacent pixels in the first image such that a third image of a red, green, blue (RGB) type is generated and applying filtering to the third image based on the second image.

20. The operating method of claim 18, further comprising:
removing noise from the input image using the neural network before the converting of the input image.

* * * * *